United States Patent
Plaetzer

(10) Patent No.: US 6,926,773 B2
(45) Date of Patent: Aug. 9, 2005

(54) COATING INSTALLATION

(75) Inventor: Wilfried Plaetzer, Krefeld (DE)

(73) Assignee: Band-Zink GmbH, Langenfeld (DE)

( * ) Notice: Subject to any disclaimer, the term of this patent is extended or adjusted under 35 U.S.C. 154(b) by 0 days.

(21) Appl. No.: 10/240,233

(22) PCT Filed: Mar. 28, 2001

(86) PCT No.: PCT/EP01/03516

§ 371 (c)(1),
(2), (4) Date: Sep. 27, 2002

(87) PCT Pub. No.: WO01/77401

PCT Pub. Date: Oct. 18, 2001

(65) Prior Publication Data

US 2003/0075105 A1 Apr. 24, 2003

(30) Foreign Application Priority Data

Apr. 6, 2000 (DE) .................................. 200 06 302 U

(51) Int. Cl.[7] .............................................. B05C 19/02
(52) U.S. Cl. .............................. 118/423; 118/DIG. 15; 118/419
(58) Field of Search .................... 118/423, 419, 118/DIG. 15; 310/90.5; 384/317, 320, 900, 446, 448, 905, 476

(56) References Cited

U.S. PATENT DOCUMENTS

| 1,777,139 A | | 9/1930 | Fitzgerald et al. |
| 3,221,389 A | * | 12/1965 | Cowell |
| 4,561,313 A | * | 12/1985 | Habermann et al. |
| 4,650,132 A | * | 3/1987 | Graf et al. |
| 4,973,172 A | * | 11/1990 | Nisley et al. ............... 384/492 |
| 5,315,873 A | * | 5/1994 | Jin |
| 5,465,681 A | * | 11/1995 | Pasztor |
| 5,630,881 A | * | 5/1997 | Ogure et al. |
| 5,987,871 A | * | 11/1999 | Winzen |
| 6,373,156 B2 | * | 4/2002 | Suzuki et al. |
| 6,485,531 B1 | * | 11/2002 | Schob |
| 6,524,227 B1 | * | 2/2003 | Isometsa et al. |
| 6,562,412 B1 | * | 5/2003 | Fontaine |

FOREIGN PATENT DOCUMENTS

| DE | 195 11 943 | | 10/1996 |
| DE | 198 23 854 | | 12/1999 |
| DE | 102 22 801 | * | 12/2003 |
| EP | 01 45 547 | | 6/1985 |
| EP | 04 18 839 | | 3/1991 |
| JP | 03 197658 | | 8/1991 |
| JP | 4-36450 | | 5/1992 |
| WO | 92/11398 | | 7/1992 |
| WO | 99/09329 | * | 2/1999 |
| WO | 03/002778 | * | 6/2002 |

* cited by examiner

Primary Examiner—Brenda A. Lamb
(74) Attorney, Agent, or Firm—Renner, Otto, Boisselle & Sklar, LLP

(57) ABSTRACT

The coating device for coating a metal band (12) in a melt (14) of a non-magnetic metal comprises a shaft (16) rotatable in the melt (14) for guiding the metal band (12). The shaft (16) is supported in a shaft bearing ($26_1$) that is a magnetic bearing whose stationary portion ($28_1$) is encapsulated. Thus, a contactless shaft support in a metal melt is obtained, whereby the bearing wear is largely reduced and the service life of the bearing is prolonged.

22 Claims, 3 Drawing Sheets

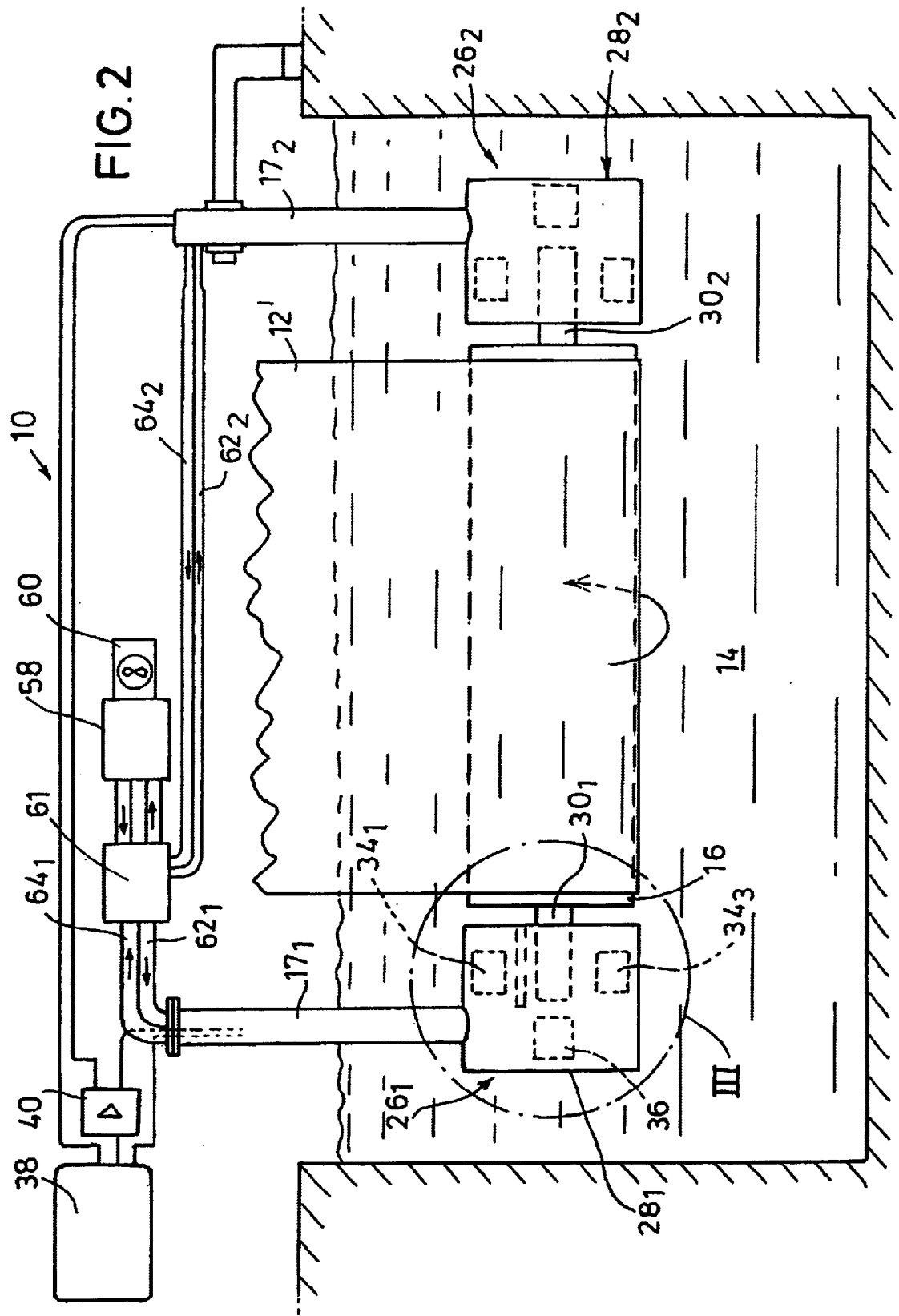

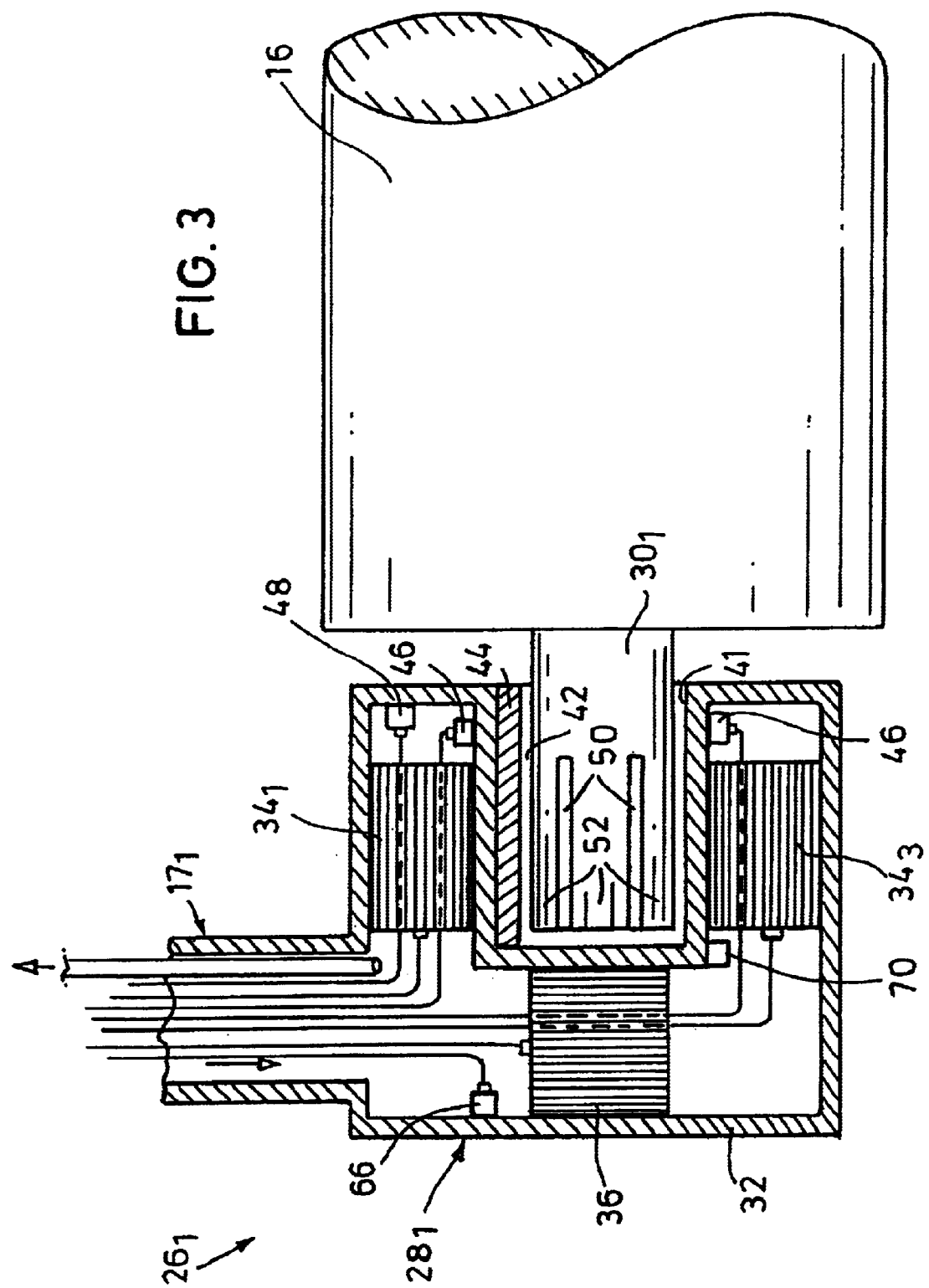

COATING INSTALLATION

The invention refers to a coating device for coating a metal band in the melt of a non-magnetic metal.

BACKGROUND OF THE INVENTION

Coating devices for coating metal bands are used, for example, for galvanizing metal bands and sheets. To accomplish this, the metal band is drawn through a zinc melt of about 450° C. The metal band continuously dives downward into the zinc melt, is deflected upward by a rotating shaft in the melt and runs upward out from the zinc melt. In the melt, the shaft is supported in open sliding bearings that are subjected to high wear due to the great forces prevailing, the high temperatures of the zinc melt and the great chemical aggressiveness of the zinc melt. In a ceaselessly operating coating installation, it takes only a few days until the sliding bearings are worn out to such an extent that they have to be replaced. Replacing the two bearings of a guide roller takes several hours which represents an important cost factor with coating installations worth between 100 and 200 million DM.

SUMMARY OF THE INVENTION

It is an object of the present invention to increase the service life of a shaft rotatable in the melt.

According to the invention, the object is solved by a coating device for coating a metal band in a melt of a non-magnetic metal, which coating device comprises a shaft rotatable in the melt for guiding the metal band, and at least one shaft bearing for supporting the shaft, and wherein the shaft bearing is a magnetic bearing whose stationary bearing portion is encapsulated.

In the present coating device, the shaft bearing is a magnetic bearing whose stationary bearing part is encapsulated. The magnetic bearing contactlessly supports a shaft stub of the shaft in the bearing portion. Due to the contactless bearing, the mechanical abrasion of the stationary bearing portion and the shaft stub is reduced to a minimum. Other than with sliding bearings, the coating of the bearing portions need not be optimized for a minimum of abrasion, but it may be provided with a coating that features a very high resistance against the metal melt. Since, at a working temperature of 450 to 470° C., a zinc melt, for example, acts like acid, the acid-resistant coating of the shaft bearing that is no longer subjected to significant abrasion, corrosion is substantially reduced at the shaft bearing. Thus, the contactless bearing largely avoids mechanical abrasion of the bearing portions, thereby allowing the use of economical acid-resistant coatings for the bearing portions and reducing corrosion. Grace to these two effects, the service life of the shaft bearings is increased to a multiple of the service life of sliding bearings. The service life of the magnetic shaft bearings in a zinc melt could increase to several weeks when magnetic bearings are used.

An open continuous gap remains between the encapsulated stationary bearing portion and the shaft stub of the shaft so that the shaft stub can be held floating in the stationary bearing portion and the shaft stub does not contact the stationary bearing portion. Thus, the shaft rotates with very little resistance. Since the magnetic field must not be shielded in the continuous gap between the stationary bearing portion and the shaft stub, the magnetic bearing is suitable only for use in melts of non-magnetic metals such as zinc.

As the capsule of the stationary bearing portion, a bearing housing of non-magnetic and high-temperature resistant material is provided having a melting point above 600° C. The capsule may be embodied by a stainless steel housing, for example.

Preferably, the bearing housing is supplied with cooling gas for cooling the magnetic elements of the stationary bearing portion. Generally, the magnetic elements are solenoids whose efficiency is higher at low working temperatures, i.e. the magnetic fields generated thereby are stronger at lower working temperatures. Further, the housing may accommodate a gas pressure sensor for detecting gas leakage flows. This may be a pressure sensor, for example, which detects the gas pressure within the bearing housing. A pressure drop in the bearing housing would indicate a leak in the bearing housing so that damages to the bearing housing can be detected soon and greater damage can be avoided. The cooling gas is supplied into the bearing housing under pressure so that it will escape outward through possible leaks of the bearing housing, thereby preventing metal melt from entering the bearing housing so that serious damages to the magnetic bearing can be avoided.

Preferably, the shaft is an immersion roller for deflecting or guiding the metal band in a zinc melt. The shaft may also be embodied as a guide roller for controlling the band tension or for an exact positioning of the metal band.

According to a preferred embodiment, the shaft bearing has a ceramic emergency running insert. The ceramic insert is attached to the inner surface of the bearing housing so that upon failure of the magnetic elements of the stationary bearing portion, the shaft stub of the shaft runs on the ceramic insert. Only the shaft stub of the shaft, which is softer than the ceramic insert, can then be abraded or damaged. The shaft stub can afterwards be repaired or replaced in a relatively simple manner. Thus, the shaft bearing has emergency running properties that avoid greater damage should the magnetic bearing fail.

According to a preferred embodiment, the shaft stub of the shaft and/or the bearing housing is provided with a tungsten carbide layer or a ceramics layer. Both coatings give a high resistance against acid and thus a good protection against corrosion by highly acid-like metal melts such zinc melt.

Preferably, the shaft stub of the shaft is made from magnetic material, the stationary bearing portion comprising a magnetic element generating a magnetic field that contactlessly holds the shaft stub in the bearing portion. The magnetic element may be a solenoid. Solenoids are advantageous in that the strength of the magnetic field generated can be controlled. The strength of the magnetic field can thus be adapted to the given conditions, depending on the prevailing stresses, numbers of rotations, etc. Thus, the gap between the shaft stub and the bearing housing can be maintained substantially constant over the entire circumference.

Preferably, the shaft bearing is designed as a radial bearing, the magnetic element or elements being arranged radially with respect to the shaft stub. Further, the shaft bearing can additionally be designed as an axial bearing with one magnetic element being arranged axially of the shaft stub. In this manner, the shaft is supported contactlessly both in the radial and the axial directions.

According to a preferred embodiment, sensors for detecting the radial and/or the axial position of the shaft stub in the stationary bearing portion are provided. Depending on the position of the stub in the bearing portion detected by the sensors, a control device controls the magnitude of the magnet field generated by the magnetic element. Thus, the gap between the bearing housing and the shaft stub is maintained constant. Deviations in the gap height can be detected immediately by the sensors and can be compensated by correspondingly controlling the magnetic elements.

Preferably, the bearing portion comprises a plurality of magnetic elements and the shaft stub comprises pole shoes, the magnetic elements generating a rotary field driving the shaft through the pole shoes of the shaft stub. Alternatively, the shaft could also be designed as a squirrel cage motor, a plurality of insulated copper leads being arranged in the shaft along its longitudinal direction and being electrically connected with each other. Here, the shaft is generally driven at a circumferential velocity that approximates the band velocity of the metal band guided by the shaft. Thus, slip between the metal band and the shaft is avoided, whereby the coating of the metal band with the molten metal is more uniform and more flawless.

According to a preferred embodiment, the shaft bearing has a heating device. It is the purpose of the heating device to maintain the shaft bearing on a temperature so high, even after removal from the metal melt that the molten metal in the circumferential gap between the bearing housing and the shaft stub remains liquid until the shaft stub is removed from the bearing housing.

According to a preferred embodiment, the bearing portion comprises four magnetic elements equidistantly distributed over the circumference thereof. The resultant of the forces acting on the shaft during operation of the coating device should lie exactly between two magnetic elements, i.e. at 45° relative to two magnetic elements. The forces acting on the shaft always hold the shaft in a stable position between the magnetic elements. It is conceivable to have more than four magnetic elements distributed over the circumference.

BRIEF DESCRIPTION OF THE DRAWINGS

The following is a detailed description of an embodiment of the invention with reference to the drawings.

In the figures:

FIG. 2 illustrates the coating device of FIG. 1 in front view, and FIG. 3 is a longitudinal section of a magnetic bearing of the deflecting shaft of the coating device of FIGS. 1 and 2.

DETAILED DESCRIPTION

Figure 1:
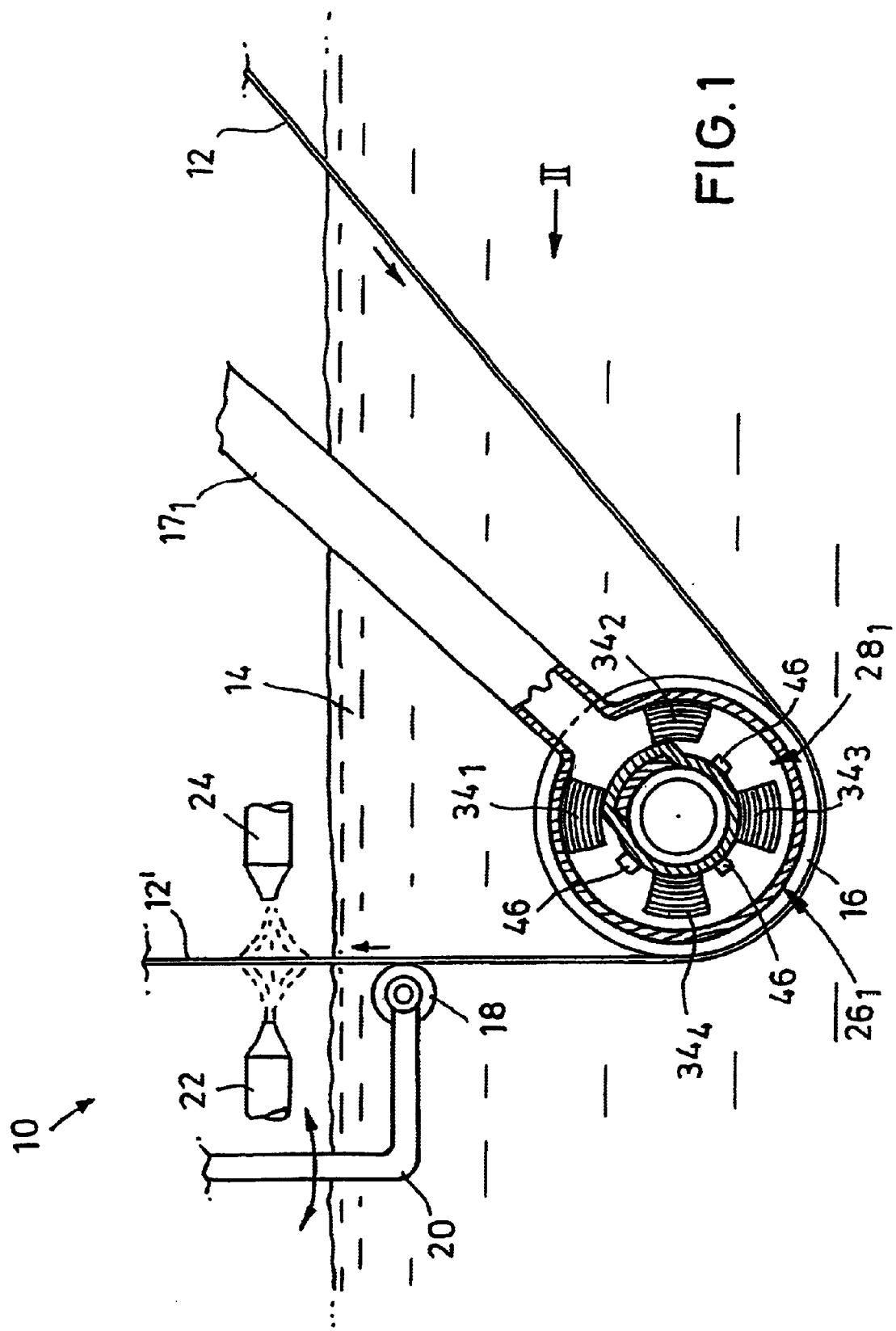
FIG. 1 illustrates a coating device according to the present invention comprising a deflecting shaft and a guide shaft in a zinc melt in side elevational view.

FIG. 1 is a simplified side elevational view of a coating device 10. A metal band 12 is guided through a melt 14 of zinc to provide the surface of the metal band 12 with a thin layer of zinc. The zinc melt 14 has a temperature of 450° to 470° C. The metal band 12 is introduced into the zinc melt under an angle of 30° to 45° to the horizontal and it is deflected upward in the melt 14 by a first rotatable shaft 16 so that the metal band 12' is guided vertically upward out from the zinc melt 14. The contact angle of the metal band 12, 12' about the first shaft 16 is 120 to 135°. The tensile force of the metal band 14 is between 1.0 and 5.0 t.

The metal band 12' emerging vertically from the zinc melt 14 is contacted over its entire width by a second shaft 18 in the zinc melt 14 in order to dampen the horizontal flapping of the metal band 12'. The second shaft 18 is suspended at a mobile guide arm 20 that is pivotally supported and whose pivot movement is dampened by a corresponding damping element. Further, the guide arm 20, and thus the second shaft 18, is biased towards the metal band 12'. Both shafts 16, 18 are immersed in the melt 14.

On both sides of the metal band 12' vertically leaving the zinc melt 14, gas nozzles 22, 24 are arranged through which a gas flow is applied onto both sides of the metal band 12'. The gas flow the liquid zinc layer on the metal band 12' is reduced to a certain constant layer thickness.

The first shaft 16 is held in the zinc melt 14 by two pivot arms $17_1$, $17_2$. For maintenance and repair purposes meant to compensate for the wear, the shaft 16 can be lifted from the zinc melt 14. Also the guide arm 20 with the guide shaft 18 can be lifted out of the melt 14 for this purpose. The arms $17_1$, $17_2$, 20 are lifted from the melt 14 by means of a changing traverse.

As is obvious, among others, from FIG. 2, the two immersed ends of the pivot arms $17_1$, and $17_2$ are provided with shaft bearings $26_1$, $26_2$ through which the deflecting shaft 16 is rotatably supported at the pivot arms $17_1$, and $17_2$. The two shaft bearings $26_1$, $26_2$ are magnetic bearings formed by an encapsulated stationary bearing portion $28_1$, $28_2$ and two shaft stubs $30_1$, $30_2$ of the shaft 16 of magnetic material, e.g. of tool steel.

As is shown in FIG. 3, the stationary bearing portion $28_1$ is a liquid-tight bearing housing 32 of non-magnetic material, e.g. stainless steel such as 1.4571 or 1.4404. A total of five solenoids $34_1$-$34_4$, 36 are fastened in the bearing housing 32. The four solenoids $34_1$–$34_4$, disposed radially of the shaft stub $30_1$ are each arranged under an angle of 90° with respect to each other and under about 45° with respect to the resultant of all forces acting on the shaft 16.

The magnetic elements $34_1$–$34_4$, 36 are controlled by a control device 38 and an amplifier 40 such that the shaft stubs $30_1$, $30_2$ are held floating in the circularly cylindrical space enclosed by the bearing housing 32. A circumferentially extending gap 42 remains between the shaft stub $30_1$ and the bearing housing, the gap being filled with zinc melt. Since zinc is a non-magnetic metal, the zinc melt in the circumferential gap 42 does not affect the magnetic field generated by the solenoids $34_1$–$34_4$, 36.

In the upper half of the cylinder-like recesses 41 of the bearing housing 32, a ceramic emergency running insert 44 is fastened that, upon failure of the magnetic elements 34, 36, prevents the shaft stub $30_1$ from abrading the bearing housing wall 32 of stainless steel and thereby allowing zinc melt to enter the bearing housing 32. The ceramic emergency running insert may also be cup-shaped and can fill the entire recess 41.

A plurality of distance sensors 46, 48 are arranged in the bearing housing 32 that determine the axial and radial positions of the shaft stub $30_1$ or the shaft 16 with respect to the bearing housing 32. Electrical lines connect the sensors 46, 48 with the control device 38 that evaluates the sensor signals and controls the solenoids accordingly.

The shaft stub 301 has five radial grooves 50 so that five pole shoes 52 are formed in the raised portions. Through the control device a rotary field is generated by the radially arranged solenoids 34 so that a torque is transmitted onto the shaft stub $30_1$, thereby rotating the shaft. In operation, the shaft 16 is driven at about 25–200 rotations per minute.

As illustrated in FIG. 2, the gas supply of the coating device 10 is a gas tank 58 with a gas cooler 60. The gas used is nitrogen. The cooled nitrogen gas from the gas tank 58 is pumped through corresponding gas lines $62_1$, $62_2$ into the bearing housings $28_1$, $28_2$ by a gas pump 61 and returned into the gas tank 58 through corresponding return gas lines $64_1$, $64_2$. In the bearing housings, the nitrogen gas principally cools the solenoids 34, 36 in order to improve their efficiency.

A pressure sensor 66 in the bearing housing 32 constantly monitors internal gas pressure in the bearing housing 32. Upon a pressure drop, for example due to a leak in the bearing housing, an alarm is triggered immediately, whereupon the shaft bearings $28_1$, $28_2$ are lifted out from the zinc bath as soon as possible. The pump 61 can increase the pressure of the nitrogen gas such that the nitrogen gas escapes outward through a leak in the bearing housing and thereby prevents zinc melt from entering the same.

In the vicinity of the cup-like recess 41, heating elements are provided at the bearing housing 32 which, when the shaft bearings 26 are pivoted from the zinc melt, keep the shaft bearings $26_1$, $26_2$ warm long enough for the zinc melt to run from the recesses 41 or until the shaft bearing 26 is dismounted.

Prior to start-up, the gap 42 may be provided with a metal sleeve of a metal having a low melting point that is pushed onto the shaft stub $30_1$ before starting the installation and fills the gap 42 between the shaft stub $30_1$ and the bearing housing 32. After start-up of the installation, the sleeve will melt in the hot zinc melt while the solenoids 34 are already operating. Using the sleeve, the shaft stub $30_1$ is already centered in the stationary bearing portion $26_1$, $26_2$ at start-up and it will melt after the start to expose the gap 42 between the shaft stub $30_1$ and the housing 32.

By the contactless design of the shaft bearings $26_1$, $26_2$ the shaft 16 can always be held in the center despite a considerable longitudinal expansion.

Also the guide roller 18 is supported contactlessly by corresponding magnetic bearings.

Due to the contactless supporting of the deflecting roller 16 and the guide roller 18, the use of low-price and acid resistant materials and coatings for all parts of the bearing becomes possible. Thus, maintenance intervals of 4 weeks and more are achieved, which in turn substantially reduces the costly shut-down times. The magnetic bearings can only be used for coating with non-magnetic metals.

What is claimed is:

1. A coating device for coating a metal band in a melt of a non-magnetic metal, comprising
    a shaft rotatable in the melt for guiding the metal band, and
    at least one magnetic shaft bearing for supporting the shaft and which is capable of being immersed in the melt,
    wherein the magnetic shaft bearing includes a stationary bearing portion, and the stationary bearing portion includes a magnetic element for generating a magnetic field for contactlessly supporting the shaft, and a bearing housing encapsulating the magnetic element and forming a liquid-tight capsule for preventing the melt from coming into contact with the magnetic element.

2. The coating device of claim 1, wherein the bearing housing is made of nonmagnetic and high-temperature resistant material with a melting point above 600° C.

3. The coating device of claim 2, wherein a gas supply is provided by which the bearing housing is supplied with cooling gas for cooling the magnetic elements of the stationary bearing portion.

4. The coating device of claim 3, wherein the bearing housing accommodates a gas pressure sensor for detecting gas leakage flows.

5. The coating device of claim 2, wherein the shaft has a shaft stub with which the magnetic field interacts contactlessly to support the shaft, and the shaft stub of the shaft and/or the bearing housing are provided with a tungsten carbide or a ceramics coating.

6. The coating device of claim 1, wherein the shaft bearing comprises a ceramic emergency running insert.

7. The coating device of claim 1, in combination with a zinc melt, and the shaft is a roller immersed in the zinc melt.

8. A coating device for coating a metal band in a melt of a non-magnetic metal, comprising
    a shaft rotatable in the melt for guiding the metal band, and
    at least one shaft bearing for supporting the shaft,
    wherein the shaft bearing is a magnetic bearing whose stationary bearing portion is encapsulated, and
    wherein the shaft stub of the shaft is made of magnetic material and the stationary bearing portion comprises a magnetic element generating a magnetic field by which the shaft stub is contactlessly held in the stationary bearing portion.

9. The coating device of claim 8, wherein the magnetic element is a solenoid.

10. The coating device of claim 8, wherein the shaft bearing is a radial bearing, the magnetic element being disposed radially of the shaft stub.

11. The coating device of claim 8, wherein the shaft bearing is an axial bearing, the magnetic element being disposed axially of the shaft stub.

12. The coating device of claim 8, wherein sensors for detecting the radial and/or axial positions of the shaft stub are provided in the stationary bearing portion and that a control device is provided that controls the magnitude of the magnetic field generated by the magnetic element depending on the position of the shaft stub in the stationary bearing portion detected by the sensors.

13. The coating device of claim 8, wherein the stationary bearing portion comprises a plurality of radial magnetic elements and the shaft stub comprises pole shoes and that the magnetic elements generate a rotary field that drives the shaft through the shaft stub.

14. The coating device of claim 8, wherein the stationary bearing portion comprises at least four circumferentially equally distributed magnetic elements.

15. A coating device for coating a metal band in a melt of a non-magnetic metal, comprising
   a shaft rotatable in the melt for guiding the metal band, and
   at least one shaft bearing for supporting the shaft,
   wherein the shaft bearing is a magnetic bearing whose stationary bearing portion is encapsulated, and
   wherein the shaft bearing comprises a heating device for heating the shaft bearing.

16. A shaft bearing for supporting a shaft rotatable in a melt of a non-magnetic metal for guiding a metal band in a coating device for coating the metal band, wherein the shaft bearing is a magnetic bearing that is capable of being immersed in the melt and includes a stationary bearing portion, and wherein the stationary bearing portion includes a magnetic element for generating a magnetic field for contactlessly supporting the shaft, and a bearing housing encapsulating the magnetic element and forming a liquid-tight capsule for preventing the melt from coming into contact with the magnetic element.

17. The shaft bearing of claim 16, wherein the bearing housing is made of nonmagnetic and high-temperature resistant material with a melting point above 600° C.

18. The shaft bearing of claim 17, wherein the bearing housing has a passage through which a cooling gas can flow for cooling the magnetic element of the stationary bearing portion.

19. The shaft bearing of claim 18, wherein the bearing housing has provision for accommodating a gas pressure sensor for detecting gas leakage flows.

20. The shaft bearing of claim 17, wherein the shaft bearing comprises a ceramic emergency running insert.

21. The shaft bearing of claim 17, wherein the bearing housing is provided with a tungsten carbide or a ceramics coating.

22. The shaft bearing of claim 17, wherein sensors for detecting the radial and/or axial positions of the shaft are provided in the stationary bearing portion.

* * * * *